United States Patent [19]
Ladyjonsky

[11] Patent Number: 6,143,972
[45] Date of Patent: Nov. 7, 2000

[54] DEVICE AND METHOD FOR PLAYING MUSIC FROM A SCORE

[76] Inventor: Jacques Ladyjonsky, Ouai de l'Industrie 1, B-1000 Brussels, Belgium

[21] Appl. No.: 09/214,591
[22] PCT Filed: Jul. 3, 1997
[86] PCT No.: PCT/BE97/00077
   § 371 Date: Jan. 8, 1999
   § 102(e) Date: Jan. 8, 1999
[87] PCT Pub. No.: WO98/01842
   PCT Pub. Date: Jan. 15, 1998

[30] Foreign Application Priority Data

Jul. 7, 1998 [BE] Belgium ................................. 9600617

[51] Int. Cl.⁷ ............................. G10H 1/18; G10H 1/36
[52] U.S. Cl. ............................. 84/615; 84/609; 84/649; 84/653; 84/470 R
[58] Field of Search ............................. 84/609–610, 613, 84/615–617, 628–630, 633–637, 645, 649–650, 653–655, 662, 665–666, 669, 470 R, 471 R, 477 R, 478

[56] References Cited

U.S. PATENT DOCUMENTS 3,460,425  8/1969  Kiepe ........................................ 84/470
3,754,495  8/1973  Honegger ................................... 84/471
4,098,165  7/1978  Akiyama .................................... 84/470
5,192,826  3/1993  Aoki ......................................... 84/737

FOREIGN PATENT DOCUMENTS 0 057 335  8/1982  European Pat. Off. .
496 291    9/1970  Switzerland .

Primary Examiner—David Martin
Assistant Examiner—Marlon Fletcher
Attorney, Agent, or Firm—Pillsbury Madison & Sutro LLP

[57] ABSTRACT

A keyboard-based device for simultaneously reading and playing music on the basis of the conventional written score thereof is disclosed. The device includes a microcomputer and a graphic tablet for holding a paper sheet or a set of score sheets to be processed sequentially, and recognizing any X and Y axis position of the score touched by the tip of a pointer handled by a performer. Each of the graphic tablet X and Y signals thus activated is transmitted to the microcomputer, which has software preprogrammed according to the score in question. Programming is such that any X-Y pair activated on the page triggers a signal that initiates a signal stream for inputting into a sound generator optionally built into the device. The generator then outputs the note closest to the contact point with the pointer on the score.

13 Claims, 2 Drawing Sheets

DEVICE AND METHOD FOR PLAYING MUSIC FROM A SCORE

This application is the national phase of international application PCT/BE97/00077 filed Jul. 3, 1997 which designated the U.S.

FIELD OF THE INVENTION

The present invention relates to a device and a method for performing or interpreting a work of music, starting from a traditional score, used as if it was a keyboard, accessible to interpreters with no particular experience in practising an ordinary musical instrument and in the knowledge of rules of musical writing.

According to the present invention, an interpreter can in an easy and performing way, play a work of music, by touching sequentially, with a special pointer, the notes displayed on the staff lines of the traditionally written musical score.

BACKGROUND OF THE INVENTION

There are known systems for teaching music where staff lines are displayed with, on the staff, the notes of the scale, said notes as well as the board bearing them, being built in such a way that, being electrically connected to a tone generator, each note on the board is sounding and heard with the corresponding tone, each time it becomes touched. The note may be touched either with the finger or with a pointer or wand, electrically connected by a wire to the tone generator. Several patents have been granted for devices of that kind among them, the German patent 2941630; several other patents have been granted for improvements, sometimes of details.

The present invention uses a principle analogous to the one described in the German patent 294 1630 and the abovementioned improvement patents, not—or not only—for illustrating in a sounding way the writing of the musical scale, but for properly playing, i.e. interpreting, a whole work of music, performing it even with more virtuosity and sensibility than if played on the keyboard of a traditional instrument. Furthermore, this interpretation can be performed with less musical knowledge, and less practice, than when a traditional instrument is used.

SUMMARY OF THE INVENTION

According to the invention, there is used the written score, or music sheet, of the work to be played as the composer or arranger has written it on paper—by touching every note sequentially, by means of the point of a special sensitive wand, or pointer, which is held in the hand.

The written conventional music sheet, on paper or equivalent material, is processed by successive pages, one page at a time. The page is laid on a digital graphic tablet, like the ones existing in computer hardware trade, associated with a small computer of following composition. From said composition and from an appropriate program, the graphic tablet recognizes any X and Y axis position of points touched by an appropriate pointer, of pencil structure, held in the hand of the interpreter, and particularly the positions where a note of the melody to be interpreted is situated. The signal identified by the computer in that way, induces the emission of a signals stream, like MIDI signals, sent into a tone generator which outputs the corresponding note.

The device is then acting as a "keyboard" allowing the interpreter to play the notes he chooses (provided they are on the music sheet) and according to his will, in what concerns their succession and the tempo. He may, in particular, like on a real keyboard, skip a note, come back to a note, etc.

The pointer has a transducer which transmets to the computer, according to the interpreters will, the emission order for signals controlling one or several sound parameters of the melody. Typically such a transducer is a pressure sensor of which the signal translates the pressure exerted by the interpreter in the direction of the graphic tablet, via an axial rod in the pointer, into control of the melody sonic volume. Other transducers, for instance fitted at the pointer sides, may actuate other sound parameters like vibrato, reverberation, etc.

Furthermore, the axial rod in the pointer, linked to its pressure sensor, and for which the travelled stroke is function of the force exerted by the interpreter, is advantageously provided with two small switches, actuated in sequence, in the stroke direction, and of which the function is to send to the computer an indication of the stroke speed, which will be translated—in a known way—into a "velocity" indication, sent to the tone generator which will process it for an appropriate coloration of the sound. This is particularly interesting for piano sounds.

With the above described arrangements, it is understandable that the interpreter can translate, literally note by note, any interpretation nuance he wants to express.

For programming the computer software, the surface of the graphic tablet is fictitiously divided into a large number of rectangles, preferably all equal, of which the base (in abscissa axis) is for instance in the range of 2 or 3 times the diameter of the note heads of the melody, and of which the height (in ordinate axis) is equal to the pace or distance between written score staffs, or staff couples. Such staff couples or pairs, often named "systems" by the musiciens, are composed of one staff with the melody written on it, associated with one staff with the harmonic accompaniment written on it.

When printing the score on paper (or similar material) care has to be taken for each note head of the melody to correspond to one of these predetermined fictive rectangles. Except for this constraint, the writing of the melody on the music sheet is conventional.

The microcomputer, programmed in consequence of above, has then the function of identifying which rectangle the interpreter is reaching with his pointer. The resolution asked from the graphic tablet does then not need to be very fine, just limited to the dimension of one of these rectangles. For playing a note, the interpreter touches the head of it, but practically, it is enough that he be into the considered rectangle surface, and there is no need for high precision.

The above description allows the following disposition. The presence of the pointer in a considered rectangle has the consequence, via an appropriate programming, to also emit the signals stream apt to deliver in the tone generator the sounds corresponding to the harmonic accompaniment associated in that place to the corresponding melody note. It is often a chord with several simultaneous sounds. The interpreter may give the whole of his attention to the melody notes, of which he has to detail the interpretation up to the smallest nuances, using them as a keyboard, while the accompaniment sounds, on the contrary, will be delivered almost automatically without action of his will. It is not necessary that the written detail of accompaniment chords be drawn entirely on the accompanying staff,—or such details may be drawn in small size, which will give to the whole sheet an appreciated gain of space. According to a particular embodiment, the accompaniment may, although being played, not be represented at all.

As the present device is mainly aimed for use by persons who are not expert in musical interpretation on conventional keyboards, the interpretation nuances allowed to them, although very rich, are limited to the melody. However, it is foreseen that certain parameters can be controlled for the separate accompaniment also, by means of known ways in particular for its volume, its reverberation level, etc., but such controlling do not equal the performance of the note-by-note interpretation permitted by the present process for the melody.

BRIEF DESCRIPTION OF THE DRAWINGS

The invention will be more clearly understood in connection with the accompanying drawings, wherein.

DETAILED DESCRIPTION OF THE INVENTION

Figure 1:
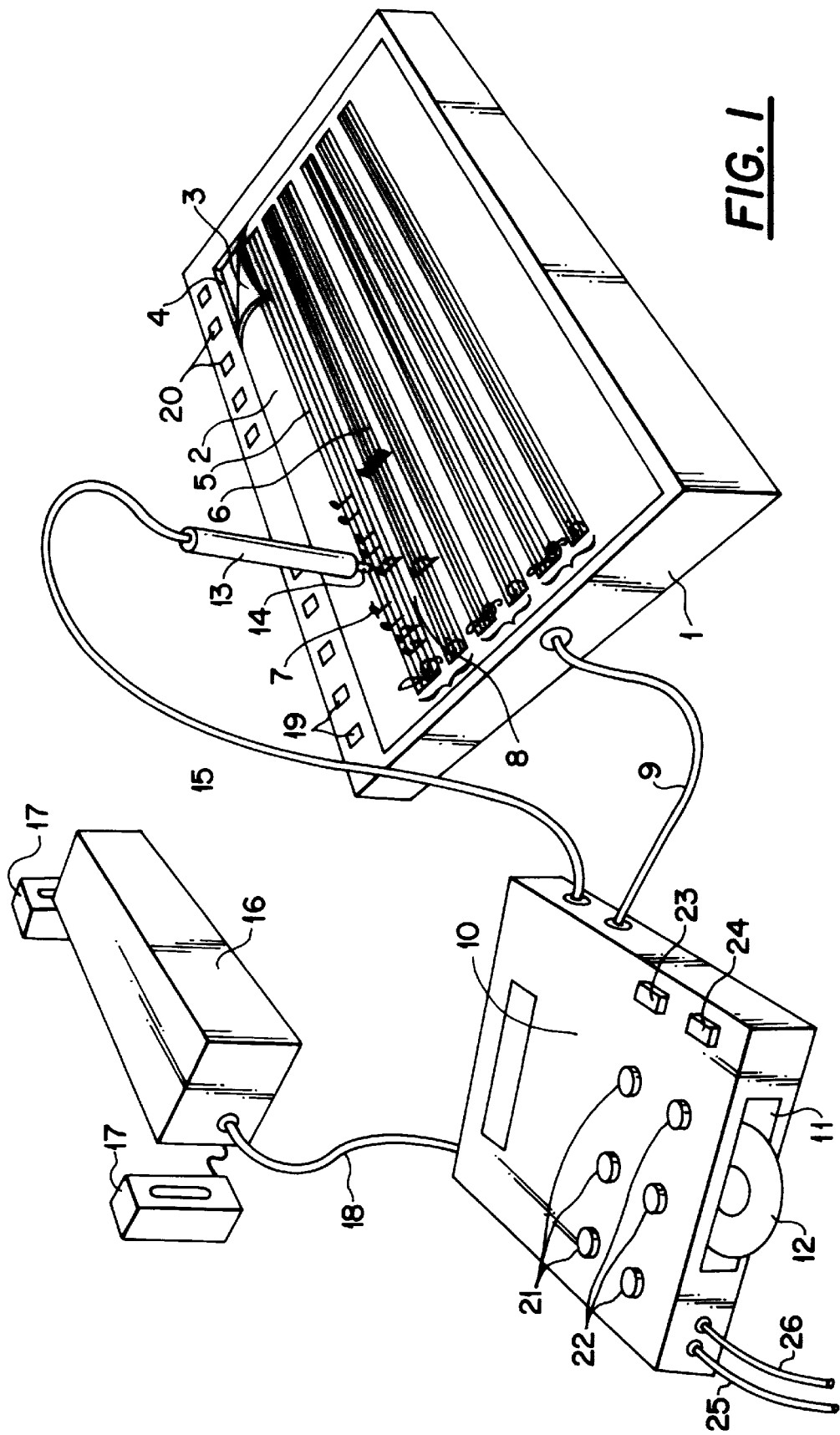
FIG. 1 is a perspective view of a graphic tablet and associated components according to the invention.

FIG. 1 is a perspective view of the graphic tablet 1 on which the score 2 is placed, which is a paper sheet of which a corner appears somewhat lifted in 3. The graphic tablet is, classically, provided with a small peripheral recess 4 which insures a good and well reproducible steadying of the sheet. The score is provided with a set of uneven staffs 5 which bear the melody notes, like 7, and a set of even staffs 6 which bear the notes of the accompaniment, typically grouped in chords like 8. The graphic tablet 1 is linked via a connection cable 9 to a small computer 10 which contains processors, memories, their ancillary equipment, and a floppy-disc drive 11.

Only 3 sets of staffs (also named "systems") are schematically represented here although a work of music is generally provided with more.

In order to play a work of music, the interpreter starts with placing the score 2 and inserting the floppy-disc 12, associated with the score and containing the memory of data related to it. He then takes in hand the pointer 13 and with its point 14, he touches the head of the melody note—or its near surrounding—that he wants to let sound. The pointer is connected to the small computer 10 by a cable 15 on the drawing. A linkage can be considered without use of cable, via known ways (transmission by proximity field on the tablet, I.R. transmission, etc.).

Every melody note is situated inside a programmed rectangle, abscisses X and ordinates Y, on the graphic tablet, but said rectangles do not need to be drawn on the score,—so that they are not visible on the figure. When the pointer penetrates inside one of these fictive rectangles, the sound corresponding to the note in it, is emitted via MIDI signals by the computer 10 into the tone generator 16 and its loudspeakers 17,—the tone generator being connected to the computer 10 by the cable 18. It is to be noted that the graphic tablet, the computer,—which is compact—and the tone generator, can be combined in one single device or "music instrument" inside a single casing.

The height of the fictitious rectangles being always this of a two-staff system, the pointer when reaching a rectangle triggers also in the computer the signals necessary to express the accompaniment notes, as far as some exist in the considered rectangle. It is the case for instance for the melody note 7 which is in the same rectangle than the accompanying chord 8.

Figure 3:
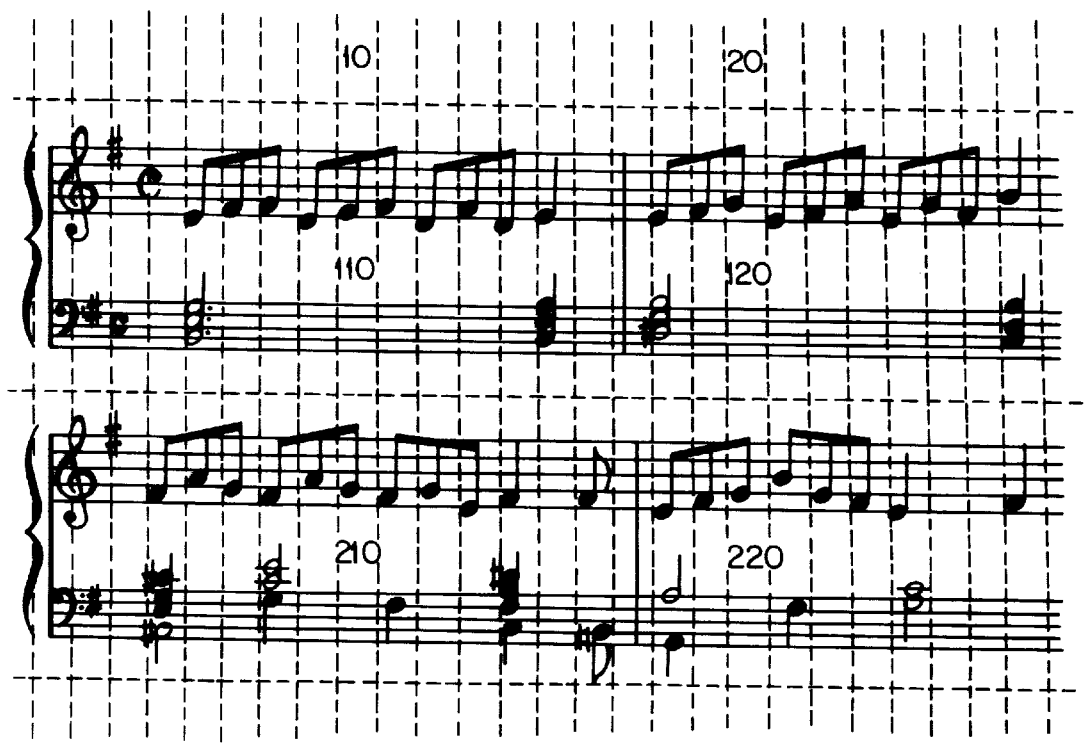
FIG. 3 is an illustration of the disposition of fictive rectangles for use according to the invention.

As the interpreter attention is laid on the melody notes, that he has to describe mindfully as if it was a real keyboard, and as said interpreter may neglect to be attentive to the accompanying chords since those are delivered in an enslaved manner, the accompanying staffs together with the notes on it, have been drawn in smaller size than for the melody staffs. FIG. 3 is an illustration of the disposition of the fictive rectangles,—in dotted lines.

Once he chooses the note he wants to play, the interpreter may not modify the nominal height of the sound he triggers, this height being preprogrammed on the floppy-disc data. But he may—and this is an essentiel aspect of the invention—act as he wants, on controlling several sound parameters as described hereafter.

A row of X-Y positions at the top of the graphic tablet, like 19, has been preprogrammed in order that when touched by the pointer, such or such instrument to be sounded for the melody is assigned, at interpreter's choice, on such or such canal in the tone generator. The same for the row 20 in what concerns the selected musical instrument or instruments to be sounded for the accompaniment. These instructions, like all the other, are translated in MIDI signals emitted by the computer 10 on the basis of the program on its software.

With his hand left available, the interpreter may, during his play, actuate the knobs 21, controlling respectively the vibrato, the reverb and the portamento of melody sounds. Same with knobs 22 in what concerns the accompaniment sounds.

If the interpreter wants to hold the duration of a melody note, it is enough for him of course to remain on it with the pointer; but if he wants to hold said sound during he plays the following notes (sustain effect) he may actuate during the wished duration, the push-button 23. Same with push-button 24 for the accompanying sound.

A LED display board is indicated by reference 27. The general value of sound volume for accompaniment is controlled by a potentiometer actuated by a foot pedal for the left foot of the interpreter. As in the previous cases the variable signal so induced, acts on the emission of MIDI signal streams which induce the appropriate volume value in the considered canals. Said pedal is not represented on FIG. 1, but the cable is visible, as 25 on FIG. 1, which leads to said pedal, departing from the computer casing 10.

Figure 2:
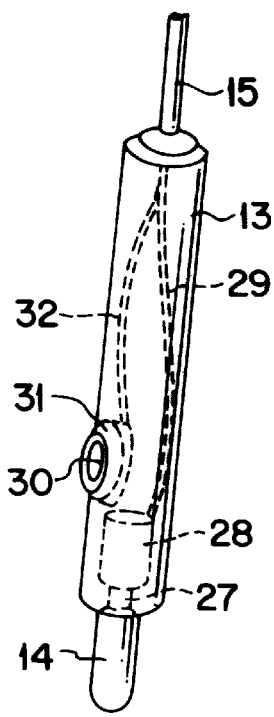
FIG. 2 is a perspective view showing a sensitive wand or pointer according to the invention.

It is the same with right pedal for general sound volume control for the melody. But this control is superposed with the one, much more sensitive, which is allowed by the pressure sensor on the pointer. FIG. 2 is a perspective view of a possible execution for the sensitive wand, or pointer, 13. It has the shape of a cylinder, connected with a thin soft cable 15, to the computer casing 10 (see FIG. 1) and is ended by the tip 14. The pressure exerted by the interpreter on this point is transmitted to an axial rod 27 acting on a transducer 28 which is, in our example, a pressure sensor sending its proportional signals via an internal wire 29 then via the small cable 15. These signals control, on a very sensitive way, and note-by-note, the sound volume of the played melody notes. The internal elements are represented in dotted lines. In 30, is illustrated a lateral control knob, acting on a transducer 35, which converts the received push into electric instructions sent also towards the computer casing 10. To it will be assigned, for instance, the vibrato parameter, or the "pitch-bend" of the played note of the moment.

EXAMPLE OF EMBODIMENT

Referring to FIG. 1, on the score, the melody notes are on the uneven staffs and those representing the accompaniment chords are on the even staffs. The considered example involves the beginning of the refrain of the work of music "Les Feuilles Mortes", by Joseph Kosma.

The drawn staffs for the melody have 5 lines spaced of 2.25 mm between them.

Those of the accompaniment have 5 lines spaced of 1.5 mm. The distance between staffs of a pair is 8.75 mm; the pace between staff pairs is 32.5 mm.

Sheet dimension is 420×295 mm (DIN A 3).

The score sheet is laid on a Wacom Ultrapad SN-A 3 graphic tablet.

The sheet is laid fixedly, due to the presence of a small peripheral recess, the reproducibility of the positioning being of about 0.2 mm. The graphic tablet is linked, by "serial" type connectors and cable, to a casing containing a microcomputer arrangement, consisting of the following elements, and programmed in the following way.

On one of the sides of the casing is a MIDI-Out connector, able to send its generated MIDI signals to a tone generator, which is here a Roland JV-90 synthesizer which is commercially available.

In this computer casing the following elements are assembled:

a) Two groups of control devices:
  1) the first, assigned to the melody, consists in a push-button for the sustain control, and 3 rotary knobs acting on potentiometers respectively for the vibrato, the reverb and the portamento;
  2) the second, assigned to the accompaniment and equipped the same way.

b) one floppy-disc drive, Teac 3½ inches, fitted on the casing side, receiving the floppy-disc with the program of data concerning the considered score.

c) on one of the faces, 1 serial connector, DB 9 type, for connexion to the graphic tablet, and @ 6.35 mm jacks for connexion of the two volume pedals, which are classical potentiometric ones.

d) A central processor, Intel 386 EX.

e) The program memory includes:
  1 EPROM 27512 for the BIOS and the execution program
  1 serial EEPROM 24 C16 for the saving of configuration parameters
  1 megabyte of dynamic RAM for loading the score data as supplied by the floppy-disc;
  1 EPLD for controlling the I²C generator, itself assigned to the control of the three following elements the EEPROM memory, the AD converters of the potentiometers, the LCD display; same ELPD controls also the floppy-disc drive.

f) an incorporated power supply.

g) A UART for the MIDI-Out.

The memory elements of the computer, as well as the floppy-disc contents, associated with the considered score, have been programmed in the following way.

The abscissas X of the graphic tablet are divided in 4 mm intervals. The ordinates Y in 32.5 mm intervals, which are the pace of the staff pairs ("systems"). Thus there are 420:4=105 times 295:32.5 =9 i.e. 945 rectangles.

When drawing the score, care has been taken that the melody note heads, of which the diameter is 2 mm, are always centered into one of these rectangles.(The rectangles could be drawn on the score, but it is not needed.)

Program and data programming have been done in order that at the moment of penetration by the pointer into any rectangle where a note is assigned the melody sound of the corresponding height is emitted, in MIDI signals, by the computer, towards the tone generator. The same for the harmonic accompaniment tones, if some have been programmed for being in the considered rectangle. It may occur also, that in a rectangle where the pointer penetrates, no melody note has been assigned, but accompaniment sounds. This, in the case where accompaniment sounds are to be delivered in a time interval between two melody notes.

The pointer is, in the present example, the digital pencil of Wacom type, associated with the Wacom Ultrapad SN-A3 graphic tablet, as commercially available. When the pointer touches one of the considered rectangles, it sends a signal towards the tablet by a known reflection process and this signal is conveyed towards the computer by the set of serial connexions described hereabove. There is then no linking cable for the pointer of this example.

Besides, the Wacom pointer has been modified to actuate a pressure sensor of which the proportional signal is sent towards the computer as described hereabove.

The programming has been made in such a way that said signal induces the emission of MIDI signals controlling the sound volume of the melody. The pressure sensor allows to recognize 128 pressure levels and supplies then a very good sensitivity for volume interpretation.

In the considered example, on the Roland JV-90 synthesizer, there are 16 canals to be called and every of them can be assigned to an instrument. One may call, or not, the same for melody and accompaniment. For the accompaniment, one may let play more than one instrument if the programming has been made in this respect, for the considered score. The programming in "General MIDI" on the floppy-disc may be done, or not. The vibrato, portamento, reverb parameters, and other of the same kind, are controlled by the knob on the computer casing, as cited hereabove. They just have to be assigned to the required control.

What is claimed is:

1. A device with keyboard function, for simultaneously reading and playing a work of music, from a written conventional score of said work, said score comprising staffs or staff sets, the device including a microcomputer; and a graphic tablet for holding hold a paper sheet, or a set of sheets to be handled successively, said sheet comprising written music score, and recognizes any X and Y axis positions of the score touched by the tip of the pointer handled by a performer to provide X and Y signals, each of the X and Y signals thus activated being transmitted to said microcomputer, which has software preprogrammed according to the said score, said preprogramming being such that any X and Y pair activated on the page triggers a signal that initiates a signal stream to a sound generator, optionally built into the device, which then outputs the note closest to the contact point with the pointer on the score or the appropriate chord of accompaniment sounds.

2. The device as set forth in claim 1, wherein the resolution for the X-Y pairs is, in the X axis, about twice the diameter of the melody note heads, and the resolution in the Y axis is the value of the distance pace between the staffs, or staff sets.

3. The device as set forth in claim 1, wherein the staff sets are staff pairs, these consisting in, melody notes staff, and, accompaniment notes staff.

4. The device as set forth in claim 1 wherein there are only single staffs, said single staffs bearing melody notes.

5. The device as set forth in claim 1, wherein the pointer comprises at least one transducer able to transmit at least one control signal for a sound parameter, other than its height, to the tone generator, with the control signal features depending from the action exerted by the performer on said transducer.

6. The device as set forth in claim 5, wherein the pointer is fitted with a pin acting onto the transducer, which is inside the pointer, said transducer initiating, in function of the pressure exerted by the performer's hand towards the score and the tablet, the sending of a signal controlling one parameter of a melody sound associated to a melody note staff.

7. The device as set forth in claims 5 wherein the considered parameter is the sonic volume of the melody.

8. The device as set forth in claim 1 wherein the pointer is fitted with an axial rod, sliding under an pushing action, and actuating in the course of its stroke, two small switches sequentially, in order to send to the microcomputer software a velocity dependent signal.

9. The device as set forth in claim 1 wherein the pointer comprises at least one transducer laterally fitted on its body, said transducer or transducers being sensitive to action by the performer's fingers, said transducer or transducers being linked to the software supporting microcomputer for controlling one or several secondary parameters of the sound.

10. The device as set forth in claim 9 wherein the secondary parameter or parameter are a vibrato, a reverbaration, a legato, a portamento towards a neighbor note, a glissando, or a pizzicato effect.

11. The device as set forth in claim 1 wherein the pointer has an elongated shape, wherein one end is a tip, associated with an axial rod acting on a transducer.

12. A method for performing a work of music with use or the device or instrument as set forth in claim 1 wherein a performer lays a paper sheet with the score onto the tablet, then touches sequentially with the pointer a succession of positions according to the performer's desire, according to the performer's inspiration while viewing the melody note heads written on the score, according to the performer's own desired rhythm and tempo.

13. The device as set forth in claim 1 wherein the microcomputer comprises at least one knob for controlling one or several secondary parameters of the sound.

\* \* \* \* \*